(12) United States Patent
Decker et al.

(10) Patent No.: US 9,632,001 B2
(45) Date of Patent: Apr. 25, 2017

(54) TESTING DEVICE HAVING A TEST GAS CONTAINER

(71) Applicant: INFICON GmbH, Cologne (DE)

(72) Inventors: Silvio Decker, Cologne (DE); Ludolf Gerdau, Elsdorf (DE)

(73) Assignee: INFICON GmbH, Cologne (DE)

( * ) Notice: Subject to any disclaimer, the term of this patent is extended or adjusted under 35 U.S.C. 154(b) by 216 days.

(21) Appl. No.: 14/407,512

(22) PCT Filed: Jun. 13, 2013

(86) PCT No.: PCT/EP2013/062226
§ 371 (c)(1),
(2) Date: Dec. 12, 2014

(87) PCT Pub. No.: WO2013/186295
PCT Pub. Date: Dec. 19, 2013

(65) Prior Publication Data
US 2015/0192489 A1    Jul. 9, 2015

(30) Foreign Application Priority Data
Jun. 14, 2012 (DE) ........................ 10 2012 210 040

(51) Int. Cl.
| | |
|---|---|
| *G01M 3/02* | (2006.01) |
| *G01M 3/32* | (2006.01) |
| *G01M 3/34* | (2006.01) |
| *G01M 3/00* | (2006.01) |

(52) U.S. Cl.
CPC .............. *G01M 3/02* (2013.01); *G01M 3/007* (2013.01)

(58) Field of Classification Search
CPC ............ G01M 3/34; G01M 3/32; G01M 3/02; G01M 3/00; G01M 3/007
See application file for complete search history.

(56) References Cited

U.S. PATENT DOCUMENTS

| | | | |
|---|---|---|---|
| 5,131,263 | A | 7/1992 | Handke et al. |
| 5,242,111 | A | 9/1993 | Nakoneczny et al. |
| 5,907,093 | A | 5/1999 | Lehmann |
| 7,559,231 | B2 | 7/2009 | Kanematsu et al. |
| 8,448,498 | B1 * | 5/2013 | Kelley .................. G01M 3/329 73/49.3 |
| 8,910,509 | B2 * | 12/2014 | Terentiev .............. G01M 3/227 73/40 |
| 2011/0219891 | A1 | 9/2011 | Mihaylov et al. |

FOREIGN PATENT DOCUMENTS

| | | | | |
|---|---|---|---|---|
| CN | 1258351 | A | 6/2000 | |
| CN | 1967183 | A | 5/2007 | |
| CN | 101140194 | A | 3/2008 | |
| DE | 4320363 | A1 | 12/1994 | |
| DE | 102009012213 | A1 * | 9/2010 | ............ G01M 3/007 |
| DE | 102013114441 | A1 * | 6/2015 | ............ G01M 3/007 |
| EP | 2447694 | A1 | 5/2012 | |
| WO | 02095348 | A1 | 11/2002 | |

* cited by examiner

*Primary Examiner* — Nguyen Ha
(74) *Attorney, Agent, or Firm* — The Webb Law Firm

(57) ABSTRACT

A testing device includes a test gas container, which is provided with a test leak for producing a test gas flow at a predefined leakage rate. The test leak includes at least one capillary tube, which connects the interior of the test gas container to the outer surroundings of the test gas container in a gas-conducting manner. The test gas container is at least partially made of a flexible material.

9 Claims, 1 Drawing Sheet

TESTING DEVICE HAVING A TEST GAS CONTAINER

CROSS-REFERENCE TO RELATED APPLICATIONS

This application is the United States national phase of International Application No. PCT/EP2013/062226 filed Jun. 13, 2013, and claims priority to German Patent Application No. 10 2012 210 040.7 filed Jun. 14, 2012, the disclosures of which are hereby incorporated in their entirety by reference.

BACKGROUND OF THE INVENTION

Field of the Invention

The invention relates to a testing device having a test gas container and a test leak.

Description of Related Art

For testing the tightness of hollow bodies to be tested, such as food packages, for example, leak testing systems are used that subject the hollow body under test to a defined differential pressure or to a defined pressure for a predetermined period of time. The variation of the external pressure over this period of time serves as an indication of an existing leak in the hollow body. The leak testing systems have to be checked for functionality at regular intervals. For this purpose, testing devices are used that simulate the leaky hollow body by comprising a test gas container provided with a test leak for producing a test gas flow at a predefined leakage rate. In this regard, the test leak is formed by at least one capillary tube connecting the interior of the test gas container with the outer environment thereof in a gas-conducting manner.

The test gas container serves as a source of the test gas supplied to the leak testing device via the test leak. Conventional test gas containers are typically of a rigid design, being made of metal, for instance. Test gas containers with permeation leaks or with capillary leaks exist that each have a defined leakage rate. The leakage rate is defined by the leakage rate of the capillary tube or the membrane and by the differential pressure between the test gas container and the environment.

For leak test systems that test the tightness of packages, for example, testing devices are required that are used regularly at recurring intervals and provide test leaks with a relatively high leakage rate. With rigid test gas containers, there is a difficulty that a high leakage rate causes a great pressure drop within the test gas container and the test gas container often has to be refilled in order to avoid that the leakage rate drops too quickly. The volume of the known test gas containers is comparatively small, since the testing device must not be much larger than the objects to be tested. For this reason, it is not possible to increase the volume of the test gas container as desired, so as to decrease the pressure drop in the test gas container.

It is an object of the invention to provide an improved testing device for producing a test gas flow with a predefined leakage rate.

The testing device of the present invention is defined by the features of claim 1.

SUMMARY OF THE INVENTION

According thereto, the test gas container is at least partly formed from a flexible material. The flexible material can be a film. Preferably, the test gas container is a bag entirely made from the flexible material, i.e. a film bag. Such a film bag can be provided in a simple manner by laying two films upon each other in their respective edge portions, i.e. along their outer edges, where they are then joined to be gas-tight. This gas-tight connection can be obtained by welding or gluing. The capillary tube may be embedded in the edge portion, i.e. welded or glued therein, so that one end of the capillary tube is connected with the interior of the test gas container and the opposite end is connected with the ambient environment.

The interior of the test gas container may preferably contain a spacer that is configured to keep at least a part of the flexible material at a distance from at least a part of the other walls of the test gas container. The spacer can thus prevent the flexible material from sticking on the inner walls of the test gas container. Further, filling the test gas container is facilitated. In the case of a film bag, the spacer may be a nonwoven, a cloth or another flexible soft material introduced between the two films and acting as a spacer between them. When filling the film bag, the spacer facilitates the inflow of gas between the two films without these sticking on each other.

The length and the inner diameter of the capillary tube are selected such that, at the pressures used inside the test gas container, a leakage rate Q of the capillary tube of more than $10^{-3}$ mbar·l/s (millibar by liters per second) results. Here, the test gas container has an inner volume between 100 and 500 cm$^3$, preferably between 150 and 250 cm$^3$. An inner volume of the test gas container of about 200 cm$^3$ is particularly advantageous.

BRIEF DESCRIPTION OF THE DRAWINGS

The following is a detailed description of an embodiment of the invention with reference to the drawings. In the Figures.

DETAILED DESCRIPTION OF THE INVENTION

Figure 1:
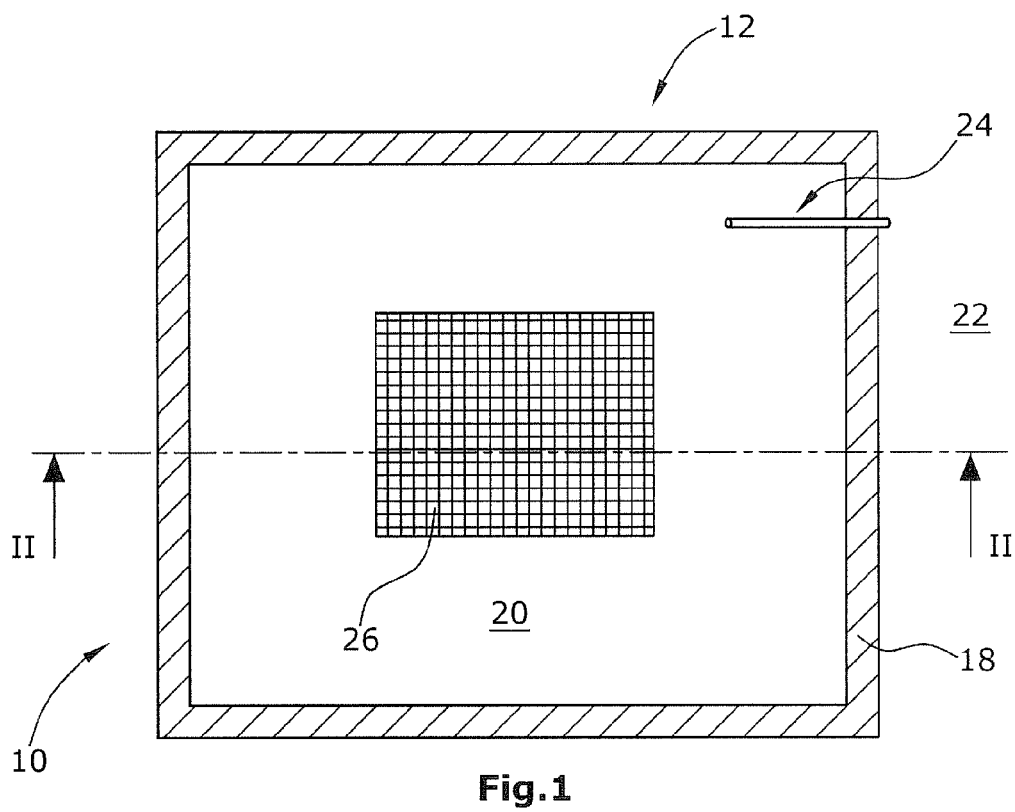
FIG. 1 is a longitudinal section through the testing device.
Figure 2:
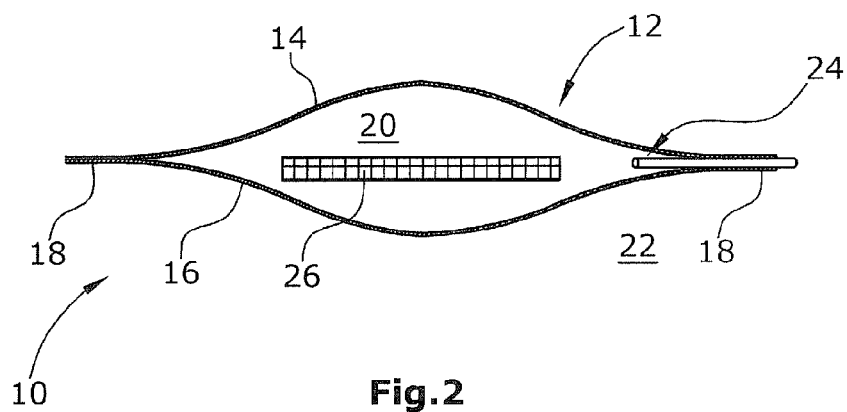
FIG. 2 is a cross section through the testing device along line II-II in FIG. 1.

The testing device 10 of the embodiment comprises a test gas container 12 in the form of a film bag. The test gas container 12 is formed by two flat films 14, 16 which are placed one upon the other and are welded to each other in their outer edge portion 18. The test gas container 12 thus encloses an interior 20 which is separated by the films from the ambient environment 22 of the test gas container.

In the edge portion 18, the test leak 24 is provided in the form of a capillary tube that connects the interior 20 with the ambient environment 22 in a gas-conducting manner. Here, the conduction of gas occurs exclusively from the interior 20 to the ambient environment 22 via the capillary tube. The length of the capillary tube is great relative to the inner diameter thereof.

A spacer 26 in the form of a flexible soft cloth is interposed in the interior 20 between the two films 14, 16. The spacer 26 prevents the two films 14, 16 from sticking on each other in the emptied state of the test gas container 12. Thereby, filling an empty test gas container 12 is facilitated.

When filling the test gas container 12, first, one of the two films 14, 16 is punctured and filled with test gas via the hole thus made. After the filling, the hole made is closed using an adhesive tape or an adhesive. As an alternative, it is also conceivable to provide one of the two films with a sealable opening.

The internal pressure of such a test gas container in the form of a film bag largely corresponds to the external atmospheric pressure. When the amount of gas in the test gas container 12 decreases, the volume of the container adjusts itself correspondingly. Thereby, the leakage rate of the testing device 10 is relatively constant for a comparatively long period of time. With a test gas container 12 having an inner volume of 200 cm$^3$ and a leakage rate of $10^{-3}$ mbar·l/s, it is possible to perform 20,000 calibration processes, the duration of each calibration to be made being 10 seconds.

The invention claimed is:

1. A testing device for testing the functionality of a leak testing system which subjects a hollow body under test to a defined differential pressure or to a defined pressure for a predetermined period of time, said testing device comprising a test gas container having a test leak for producing a test gas flow with a predefined leakage rate, wherein the test leak comprises at least one capillary tube which connects an interior of the test gas container to an ambient environment of the test gas container in a gas-conducting manner, wherein the test gas container is at least partially made of a flexible material.

2. The testing device of claim 1, wherein the test gas container is a bag entirely made of a flexible material.

3. The testing device of claim 2, wherein the bag is formed by two films joined in a gas-tight manner at their edge portions, the at least one capillary tube being embedded in the edge portion of the films.

4. The testing device of claim 1, wherein the test gas container comprises a spacer in its interior, wherein the spacer is configured to space a part of the flexible material apart from at least a part of the other walls of the test gas container.

5. The testing device of claim 4, wherein the spacer is formed by a flexible soft material.

6. The testing device of claim 1, wherein the length and the inner diameter of the at least one capillary tube are selected such that the resulting leakage rate q of the at least one capillary tube is greater or equal to $10^{-3}$ mbar·l/s.

7. The testing device of claim 1, wherein the inner volume of the test gas container is between 100 and 500 cm$^3$.

8. The testing device of claim 1, wherein the inner volume of the test gas container is between 150 and 250 cm$^3$.

9. A method for testing the functionality of a leak testing system that subjects a hollow body under test to a defined differential pressure or to a defined pressure for a predetermined period of time, the method comprising a step of simulating a hollow body under test by a testing device, the hollow body comprising a test gas container having a test leak for producing a test gas flow with a predefined leakage rate, wherein the test leak comprises at least one capillary tube which connects an interior of the test gas container to an ambient environment of the test gas container in a gas conducting manner and the test gas container is at least partially made of a flexible material.

* * * * *